(12) United States Patent
El Hajj Shehadeh et al.

(10) Patent No.: US 8,917,585 B2
(45) Date of Patent: Dec. 23, 2014

(54) METHOD FOR ESTIMATING A RECEIVED SIGNAL AND CORRESPONDING DEVICE

(75) Inventors: Youssef El Hajj Shehadeh, Göttingen (DE); Serdar Sezginer, Boulogne-Billancourt (FR)

(73) Assignee: Sequans Communications, Colombes (FR)

( * ) Notice: Subject to any disclaimer, the term of this patent is extended or adjusted under 35 U.S.C. 154(b) by 897 days.

(21) Appl. No.: 12/954,757

(22) Filed: Nov. 26, 2010

(65) Prior Publication Data

US 2011/0128842 A1 Jun. 2, 2011

(30) Foreign Application Priority Data

Nov. 27, 2009 (EP) .................... 09 177 397

(51) Int. Cl.
*H04J 11/00* (2006.01)
*H04L 25/02* (2006.01)
*H04L 27/26* (2006.01)

(52) U.S. Cl.
CPC .......... *H04L 25/022* (2013.01); *H04L 25/0222* (2013.01); *H04L 27/2613* (2013.01); *H04L 25/0224* (2013.01); *H04L 27/2647* (2013.01)
USPC ........... 370/208; 370/437; 370/465; 375/285; 375/346; 455/452.2

(58) Field of Classification Search
None
See application file for complete search history.

(56) References Cited

U.S. PATENT DOCUMENTS

| 6,314,131 | B1 | 11/2001 | Roe et al. |
| 2005/0243791 | A1 | 11/2005 | Park et al. |
| 2006/0205437 | A1 | 9/2006 | Sung et al. |
| 2007/0159959 | A1 | 7/2007 | Song et al. |
| 2007/0293256 | A1* | 12/2007 | Merched et al. ............... 455/504 |
| 2008/0219371 | A1* | 9/2008 | Hong et al. ................... 375/260 |

OTHER PUBLICATIONS

Ali Ramadan Ali et al., "Adaptive Time Interpolator for OFDM Systems in Time-Variant Channels" Jan. 18, 2009.
Hussein Hijazi et al., "Polynomial Estimation of Time-Varying Multipath Gains with Intercarrier Interference Mitigation in OFDM Systems" Jan. 1, 2009.
European Search Report and Written Opinion dated May 20, 2010 for corresponding European Application No. 09 17 7397.8, filed Nov. 27, 2009.

* cited by examiner

*Primary Examiner* — Khoa Huynh
(74) *Attorney, Agent, or Firm* — David D. Brush; Westman, Champlin & Koehler, P.A.

(57) ABSTRACT

A method and apparatus for estimating a transmission channel in a receiver of an OFDMA signal formed by a plurality of carriers modulated by data elements and distributed in the time-frequency domain in successive symbols, the plurality of carriers including pilot carriers, modulated by reference data elements known by receivers. The method includes: receiving a signal comprising a series of n symbols covering at least one resource block; making an initial channel estimation by identifying the pilot carriers included in the series of n symbols; determining diagonal entries of p frequency domain channel matrices $G^{(x)}$ for estimating the channel for at least x symbols among the n symbols, the x symbols being pilot symbols; determining, in the frequency domain, at least some non diagonal entries for each frequency domain channel matrix G of the n symbols from the determined diagonal entries of the x frequency domain channel matrices $G^{(x)}$.

7 Claims, 2 Drawing Sheets

METHOD FOR ESTIMATING A RECEIVED SIGNAL AND CORRESPONDING DEVICE

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to wireless digital transmission using orthogonal frequency-division multiplexing. More particularly, the disclosure relates to a method and to a device for estimating a received signal in a wireless receiver.

With the continuously increasing demand on high data rates on every application of mobile radio technology, emerging technologies like LTE (Long Term Evolution) and WiMAX (Worldwide Interoperability for Microwave Access) are advancing in order to respond to the needs for future mobile wireless access systems. One of the common aspects of LTE and WiMAX is the orthogonal frequency-division multiple access (OFDMA) adopted in the air-interface as multiple access technique for the downlink transmission. OFDMA is based on orthogonal frequency-division multiplexing (OFDM) and therefore inherits the drawbacks of OFDM transmission.

In OFDM based systems, one of the most challenging problems is the estimation of the channel in fast-varying conditions. Indeed, in high mobility scenarios, including fast-varying conditions, orthogonality between carriers in OFDM systems is destroyed and this destruction introduces Inter-Carrier Interference (ICI) terms in the received signal. Without taking into account the ICI terms of the received signal, performance of the system will degrade considerably.

Therefore, there has been a need for more sophisticated channel estimation methods to mitigate Inter-Carrier Interference. This is highly important for next generation systems especially to provide high data rates even for users moving at high speeds.

BACKGROUND OF THE DISCLOSURE

Although the channel estimation is being studied for a long time, the solutions are not applicable for OFDMA. Thus, new algorithms are needed for such emerging techniques with additional constraints.

A typical estimation for OFDM signals is provided in the document US2006/0205437, for wireless communication systems, which uses preamble. In this document, an averaging is made between first channel estimation based on the preamble and second estimation based on pilots, which are predefined carriers modulated with values known by the receivers. Following this, linear interpolation is used to obtain the channel estimates corresponding to the data.

The problem is that the method of US2006/0205437 cannot be used in fast-varying scenarios, which is a scenario where there are fast varying channel conditions. Indeed, the method proposed in US2006/0205437 would allow estimating the diagonal components of an overall channel matrix describing the transmission channel in the frequency domain. However, this method would not allow estimating the non-diagonal components of the matrix, (i.e. inter-carrier interference (ICI)) terms, which are non-zero in fast-varying scenarios. Therefore, the method of US2006/0205437 is not designed for rapidly varying channels.

A different time interpolation between the pilots is presented in US2005/0243791, however, as in US2006/0205437, the goal is only to estimate the diagonal terms of the channel matrix, which corresponds to the channel coefficients on the carriers.

In US2007/0159959, the data channel estimator is considered to be least squares (LS), linear, cubic, or polynomial interpolation, or another data channel estimation scheme to interpolate the data channel values at the data carrier locations.

Another classical method, disclosed in U.S. Pat. No. 6,314,131, proposes also linear interpolation over multi-slots for the improvement of the channel estimates. However, as in US2006/0205437 and US2005/0243791, the estimation is only done on the carrier channel values missing in the given pilot patterns.

The method only considers the channel coefficients over the symbols. In other words, such methods are lacking the estimation of the ICI terms of the channel matrix which are the dominant terms on the performance of a receiver in fast varying scenarios (high mobility scenarios).

Basis Expansion Modeling (BEM) is one of the possible ways to approximate the time-variation of the channel within a certain time window (thus allowing the estimation of the ICI terms) and has recently taken a lot of attention for fast-varying channel estimation. Basically, this method reduces the complexity as the problem is reduced to estimating the basis coefficients. Among the existing BEMs, a particular attention has been given to the polynomial BEM (P-BEM) for relatively low Doppler spreads. Although P-BEM has an attractive performance when the whole band is available for estimation, it has been shown that with a sparse pilot distribution as in current broadband wireless communication systems such as WiMAX and LTE, the P-BEM cannot be used for estimating directly ICI terms.

The improvement provided by using first order polynomial approximation in P-BEM over two successive OFDM symbols to estimate the channel variation based on given pilot distributions has been investigated. In this approach, the obtained initial estimates are used to compute the modeling parameters in the frequency domain. A similar approach but in a time domain version has also been proposed for two successive OFDM symbols and generalized to multiple OFDM symbols with a polynomial modeling of degree dependent on the number of successive OFDM symbols used in the estimation.

All these approaches have shown interesting results but they are not applicable for OFDM based systems using practical pilot distributions. Indeed, these methods are not suitable for future wireless communications systems since pilots are not defined to be present in successive OFDM symbols.

It is also worth noting that the extension of the already existing methods is not obvious for OFDMA based systems. In particular, in future wireless communication systems, available resources are allocated to users both in time and frequency domains based on standard specific resource units. These resource units occupy a small part of the available bandwidth in a certain time period (a subset of the carriers of a symbol, for a series (e.g. 6 or 7) of symbols), which prevents the usage of the existing schemes for these systems. Moreover, existing methods estimate the channel in the time domain before transferring it into the frequency one, thus requiring additional FFT (Fast Fourrier Transform) processing. The Fast Fourrier Transform is a classical operation for the conversion of a signal received in the time domain to the frequency domain.

Thus, there is a need for defining a method for estimating the ICI terms of the channel matrix, and it should be a method, which is adapted to OFDMA based systems (where resources are allocated to users in the time and the frequency domain) and is usable in fast varying conditions.

SUMMARY

In view of the drawbacks of the prior art, an illustrative example of the present disclosure aims to provide an improved method and device for estimating channel variation. This may be achieved in exemplary embodiments by the features of the independent claims.

More particularly, an example of the disclosure relates to a method for estimating a transmission channel in a receiver of an OFDMA signal formed by a plurality of carriers being modulated by data elements and distributed in the time-frequency domain in the form of successive symbols, said plurality of carriers including pilot carriers, modulated by reference data elements known by receivers, According to an example of the disclosure, said method comprises:
- a step of receiving a signal comprising a series of n symbols covering at least one resource block;
- a step of making an initial channel estimation by identifying said pilot carriers included in said series of n symbols;
- a step of determining diagonal entries of p frequency domain channel matrices $G^{(x)}$ for estimating said channel for at least some x symbols among said n symbols, said x symbols being pilot symbols;
- a step of determining, in the frequency domain, at least some non diagonal entries for each frequency domain channel matrix G of said n symbols from said determined diagonal entries of said x frequency domain channel matrices $G^{(x)}$.

Thus an exemplary embodiment allows calculating and estimating the channel variation faster than other methods, since the computation does not involve computing whole matrices for each step.

More particularly, said step of determining diagonal entries comprises:
- a step of transforming said signal from the time domain to the frequency domain, for delivering a corresponding frequency domain signal;
- a step of estimating, from said frequency domain signal, a first channel estimation in the frequency domain;
- a step of interpolating said initial channel estimation in the frequency domain in order to determine diagonal entries of said matrices $G^{(x)}$;

Thus, as working directly in the frequency domain, an exemplary embodiment allows consuming fewer resources for estimating channel variations.

More particularly, said step of determining diagonal entries is implemented for three pilot symbols.

More particularly, said step of interpolating said first channel estimation in the frequency domain employs a linear expression.

More particularly, said linear expression is:

$$G_{i,i}^{(p)} = \sqrt{N}\,(H_{i,0} + pT_0 E_i + (pT_0)^2 U_i) + \frac{N-1}{2\sqrt{N}}(E_i + 2pT_0 U_i) + \frac{(N-1)(2N-1)}{6N\sqrt{N}} U_i$$

where:
p is a symbol index of the $(p+1)^{th}$ received symbol;
N is a number of carriers of a symbol;
H is the Fourier transform of the channel impulse response for the entry i;
$T_0$ is equal to $1+L_{CP}/N$, where $L_{CP}$ is the length of the cyclic prefix;
$E_i$ and $U_i$ are the FFT transformation of basis coefficients for the variation of the channel of a certain time window:

$$U_i = \frac{[(4/7)(G_{i,i}^{(7)} - G_{i,i}^{(0)}) - (G_{i,i}^{(4)} - G_{i,i}^{(0)})]}{12\sqrt{N}\,T_0^2}$$

$$E_i = \frac{(G_{i,i}^{(4)} - G_{i,i}^{(0)})}{4\sqrt{N}\,T_0} - U_i\left(\frac{N-1}{N} + 4T_0\right)$$

More particularly, said step of determining at least some of non diagonal entries employs a polynomial expression of any order, depending on a pilot distribution among said series of symbols.

More particularly, said polynomial expression is a second order polynomial expression.

More particularly, said second order polynomial expression is:

$G_{i,k}^{(p)} = C_e(\mathrm{mod}((k-i), N))E_k + C_u(\mathrm{mod}((k-i), N))U_k + 2pT_0 C_e(\mathrm{mod}((k-i), N))U_k$ where $C_e$ and $C_u$ are constants defined as $$C_e(n) = \frac{-1}{\sqrt{N}} \cdot \frac{1}{1 - \exp(j2\pi n/N)},$$

$$C_u(n) = \frac{-1}{\sqrt{N}} \cdot \left(\frac{1}{1 - \exp(j2\pi n/N)} + \frac{2}{N} \cdot \frac{\exp(j2\pi n/N)}{(1 - \exp(j2\pi n/N))^2}\right),$$

with $n \neq 0$ and:

$$U_k = \frac{[(4/7)(G_{k,k}^{(7)} - G_{k,k}^{(0)}) - (G_{k,k}^{(4)} - G_{k,k}^{(0)})]}{12\sqrt{N}\,T_0^2},$$

$$E_k = \frac{(G_{k,k}^{(4)} - G_{k,k}^{(0)})}{4\sqrt{N}\,T_0} - U_k\left(\frac{N-1}{N} + 4T_0\right),$$

and
$G^{(7)}$, $G^{(4)}$ and $G^{(0)}$ are matrices of the eighth, fifth and first symbols of said series of n symbols and
p is a $(p+1)^{th}$ received symbol;
N is a number of carriers of a symbol;
$T_0$ is equal to $1+L_{CP}/N$, where $L_{CP}$ is the length of the cyclic prefix;

The disclosure also relates to a device for estimating a transmission channel in a receiver of an OFDMA signal formed by a plurality of carriers being modulated by data elements and distributed in the time-frequency domain in the form of successive symbols, said plurality of carriers including pilot carriers, modulated by reference data elements known by receivers.

According to the disclosure, said device comprises:
- means for receiving a signal comprising a series of n symbols covering at least one resource block;
- means for making an initial channel estimation by identifying said pilot carriers included in said series of n symbols;
- means for determining diagonal entries of x frequency domain channel matrices $G^{(x)}$ for estimating said channel for at least some x symbols among said n symbols, said x symbols being pilot symbols;
- means for determining, in the frequency domain, at least some non diagonal entries for each frequency domain channel matrix G of said n symbols from said determined diagonal entries of said x frequency domain channel matrices $G^{(x)}$.

Such a device can typically be integrated into a wireless communication terminal.

An embodiment of the disclosure also relates to a computer program product downloadable from a communications network and/or stored in a computer-readable carrier and/or executable by a microprocessor. According to an embodiment of the disclosure, such a program comprises program code instructions for the implementation of the steps of the estimation method.

BRIEF DESCRIPTION OF THE DRAWINGS

The proposed channel variation estimation method is described in the following by way of examples in connection with the accompanying figures without limiting the scope of the protection as defined by the claim. The figures show:

DETAILED DESCRIPTION OF ILLUSTRATIVE EMBODIMENTS

Figure 1:
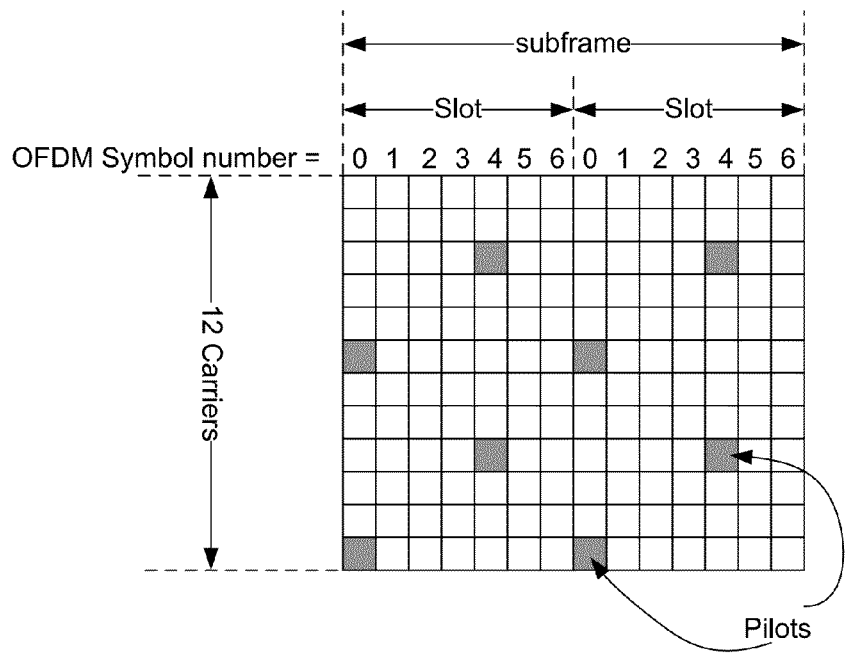
FIG. 1 is an illustration of two resources blocks, each comprising seven symbols and twelve carriers for the implementation of one embodiment of the disclosure.
Figure 2:
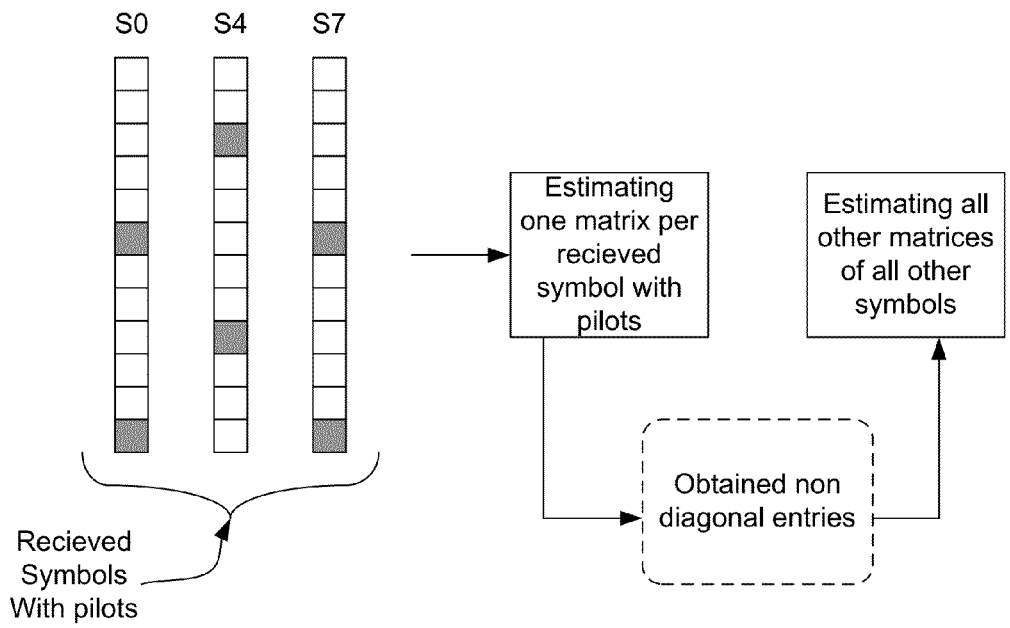
FIG. 2 illustrates an exemplary estimation method for the resources blocks presented in FIG. 1.

1. Main Features of an Exemplary Embodiment

In the following description, it is considered the example of the pilot distribution defined in the LTE specifications as an example and a focus is made on the polynomial modeling to estimate the channel for all the OFDM symbols in a given resource block (RB) as defined in LTE. In particular, an exemplary embodiment proposes a so-called double expansion modeling (DEM) of the channel. According to the disclosed embodiment, the method includes applying a first order (linear) modeling during the duration of one OFDM symbol and a second order modeling to approximate the channel variation between a predetermined numbers of OFDM symbols (for example 8). In other words, one firstly estimates each OFDM symbol with a linear modeling (which can be done very fast) and then one secondly estimates the whole channel variation between a predetermined numbers of OFDM symbols by using the first estimation which has be done.

A channel matrix in the frequency domain is determined, based on a second order polynomial modeling and an algorithm is proposed for the computation of ICI terms directly in the frequency domain without any need of estimating the entire time domain modeling parameters using P-BEM.

Thus, an exemplary embodiment allows the computation of ICI terms, for a given resource block (RB), without necessitating a first estimation of all the time domain modeling parameters using P-BEM. Thus, an exemplary embodiment makes easier and faster the calculation of the ICI terms and thus of the channel variation in fast-varying conditions. Moreover, an exemplary embodiment eliminates the need for estimation of all the time domain modelling parameters using any kind of estimators (not just the P-BEM one)

Finally, an exemplary embodiment proposes a lower complexity all-in frequency domain estimator suitable especially for OFDMA systems. It is also worth mentioning that for the skilled person in this area the techniques of an exemplary embodiment can be generalized to any OFDMA-based communication system like IEEE 802.16m or others.

As already said, an example of the disclosure relates to a method for estimating the channel in a multicarrier transmission system, where the resources are allocated among different users both in time and frequency domains. An example of the method has the following features, some of them being optional:
- receiving the multicarrier signal,
- extracting the information from the reference (pilot) signals
- generating an initial estimation based on these reference signals over the OFDM symbols having pilot signals.
- selecting the necessary bands for the estimation process covering the useful subcarriers and most preferably, the most interfering ones.
- generating the necessary diagonal components of the channel matrix from the reference symbols using any kind of frequency-domain estimation and interpolation methods,
- obtaining the whole frequency domain channel matrix including the ICI terms based on the initial estimates of the diagonal terms,
- most preferably, performing iteration to further improve the performance of the channel estimation.

In a particular embodiment, all the channel estimation steps are performed in the frequency domain which makes it highly attractive for any OFDM based systems.

2. Description of a Specific Embodiment

We present, in this embodiment, the details of implementation of the main features of the disclosure, in the best implementation.

2.1 General Consideration

OFDMA is a multiple access technique based on OFDM, where different subcarrier groups might be associated to different users. Therefore, in this section, we start with a general view over an OFDM system in order to explain more clearly an exemplary embodiment of the disclosure. In such a system, at the transmitter side, the symbols collected in symbol vector s are first transformed from the frequency domain to the time domain using an IFFT, for transmission. Then, a cyclic prefix (CP) consisting of the last transmitted symbols is added before the parallel to serial converter. At the receiver side, a serial to parallel conversion is applied, CP is removed and an FFT operation is performed to obtain the received symbols in the frequency domain.

In such a system, the expression of the received vector for the $(p+1)^{th}$ OFDM symbol can traditionally be expressed as:

$$r^{(p)} = FH^{(t)(p)}F^H s^{(p)} + z^{(p)} = G^{(p)} s^{(p)} + z^{(p)} \quad \text{(eq 1)}$$

where $H^{(t)(p)}$ and $G^{(p)}$ represent the channel matrices respectively in time and frequency domains for the $(p+1)^{th}$ OFDM symbol; F denotes the FFT operation, and z is the complex additive white Gaussian noise vector.

For an FFT size of N, it can be shown that $H^{(t)(p)}$ has the entries:

$$H_{i,k}^{(t)(p)} = h_{mod(i-k,N),p(N+L_{cp})+i}, \quad (eq2)$$

where $L_{CP}$, is the CP length.

Due to the time variation of the channel during the OFDM symbol, the frequency domain channel matrix G would not be diagonal. In fact, it will have the entries $$G_{i,k}^{(p)} = \frac{1}{\sqrt{N}} \sum_{n=0}^{N-1} H_{k,n}^{(p)} e^{j2\pi n(k-i)/N}, \quad (eq\ 3)$$

where $\{H_{k,n}^{(p)}\}_{k=0,\ldots,N-1}$ denote the Fourier Transform of the channel impulse response $\{h_{l,n}\}_{l=0,\ldots,L-1}$ at the time instant n for a channel length of L. Here, the diagonal elements of the G matrix represent frequency-domain channel values on the carriers and the non-diagonal terms correspond to the ICI terms.

It is a main point to understand that in an example of the present disclosure, the estimation problem is extended to finding the full matrix G for a given symbol (or the desired part of it corresponding to the frequency band allocated to a given user), unlike in the traditional methods in which the non diagonal entries of the matrix G are estimated in time domain (which is far much longer).

As an example, presented in relation with FIG. 1, focusing can be done on the downlink LTE systems where OFDMA has been adopted as the multiple access technique. Here, resources (in both time and frequency dimensions) are associated to users based on subframes of two resources blocks (RB). A simple resource block (RB) may consist of 6 or 7 OFDM symbols and 12 carriers. In FIG. 1, a resource block comprises seven OFDM symbols (from 0 to 6).

As for reference signals, a sparse pilot distribution in both frequency and time dimensions has been specified as shown in FIG. 1. In particular, the first and the fifth OFDM symbols of each resource block are defined to contain pilots, and, in frequency dimension, the carriers with indices multiples of 6 are used for carrying pilots.

The main focus of an exemplary embodiment of the disclosure is high speed channel estimation in OFDMA systems. As an example of this embodiment, a double expansion modeling (DEM) is used to cover channel variation for several OFDM symbols. A linear modeling (least complex) is used for the duration of one OFDM, and a 2nd degree polynomial modeling is used for the duration of 8 OFDM symbols, for such an example. The linear modeling approach is applied initially in the time domain for each symbol containing pilots, and then there is a process of direct computing of the ICI terms in the frequency domain. In another embodiment, the initial linear modeling part is done in frequency domain.

Now, one shows that the structure of the G matrix allows simplification in the channel estimation, while assuming that the channel variation over one RB, in the time domain, can be approximated by a polynomial modeling. Here, a $2^{nd}$ degree polynomial modeling is used to approximate the channel variation over 8 OFDM symbols. In this case, the expression of the channel variation for each tap (rating and phase distortion) l and for the $(p+1)^{th}$ OFDM symbol can be expressed as:

$$h_{l,n}^{(p)} = h_{l,0} + \left(pT_0 + \frac{n}{N}\right)\epsilon_l + \left(pT_0 + \frac{n}{N}\right)^2 \mu_l, \quad (eq\ 4)$$

where $0 \leq n \leq N-1$ and $T_0 = 1 + L_{CP}/N$;

$h_{l,0}$, $\epsilon_l$ and $\mu_l$ being the basis coefficients for the $l^{th}$ tap (each channel tap corresponding to a discrete channel path) representing the variation of the channel in a certain time window (i.e., over several OFDM symbols).

From (eq4), one can obtain:

$$H_{i,n}^{(p)} = H_{i,0} + \left(pT_0 + \frac{n}{N}\right)E_i + \left(pT_0 + \frac{n}{N}\right)^2 U_i, \quad (eq\ 5)$$

where $E_i$'s and $U_i$'s are the Fourier transforms of $\epsilon_l$'s and $\mu_l$'s, respectively.

2.2 Calculation of the Diagonal Terms of the Matrices

In at least one embodiment, the channel variation is estimated in two main steps: the first step is to realize the estimation for diagonal terms of the matrices G for at least a predefined number of symbols among the received symbols. In a preferred embodiment, these calculations of the diagonal entries of the matrices are done in the frequency domain. In other embodiments, these calculations are also done in time domain.

This section explains the calculation in the frequency domain

Using (eq5) in (eq3), the coefficients of the diagonal terms in the G matrix of the $(p+1)^{th}$ symbol can be found as (eq6):

$$G_{i,i}^{(p)} = \sqrt{N}\,(H_{i,0} + pT_0 E_i + (pT_0)^2 U_i) + \frac{N-1}{2\sqrt{N}}(E_i + 2pT_0 U_i) + \frac{(N-1)(2N-1)}{6N\sqrt{N}}U_i$$

for $0 \leq i \leq N-1$, because we have used where we have used the following equalities:

$$\sum_{n=0}^{N-1} N = \frac{N(N-1)}{2}$$

and $$\sum_{n=0}^{N-1} n^2 = \frac{N(N-1)(2N-1)}{6}$$

Thus, in a specific embodiment, diagonal terms are estimates, for example only for symbols which contain pilots, that is, in the example of FIG. 1, only for the first, the fifth and the eighth received symbols.

2.3 Calculation of the Non Diagonal Terms of the Matrices

The second main step of is to estimate the non diagonal terms of the matrices G, directly in the frequency domain. One demonstrates in this section the calculations made for achieving this result.

Using the properties of Fourier transform of power series, the coefficients of the non diagonal terms of the G matrix of the $(p+1)^{th}$ symbol can be written as (eq7):

$$G_{i,k}^{(p)} = C_e(mod((k-i),N))E_k + C_u(mod((k-i),N))U_k + 2pT_0 C_e(mod((k-i),N))U_k$$

where $C_e$ and $C_u$ are constants defined as $$C_e(n) = \frac{-1}{\sqrt{N}} \cdot \frac{1}{1-\exp(j2\pi n/N)}, \quad (eq\ 8a)$$

$$C_u(n) = \frac{-1}{\sqrt{N}} \cdot \left(\frac{1}{1-\exp(j2\pi n/N)} + \frac{2}{N} \cdot \frac{\exp(j2\pi n/N)}{(1-\exp(j2\pi n/N))^2}\right), \quad (eq\ 8b)$$

with $n \neq 0$.

Indeed, the non diagonal terms of the matrix G are also expressible with eq3 (see before). In eq3, $G_{i,k}^{(p)}$, is nothing but the inverse Fourier transform of $H_{k,n}^{(p)}$.

As it can be seen in equation (eq5), the first 3 terms are constant and therefore give a zero result. Now, one calculates the Fourier transform of the remaining three terms. In order to obtain the corresponding expressions one uses the following formulas of Fourier transform of power series:

If $A_n = n/N$, then:

$$IFFT(A_n)_i = \frac{1}{\sqrt{N}} \cdot \frac{-1}{1 - e^{\frac{j2\Pi(i)}{N}}},$$

for $i \neq 0$

If $B_n = (n/N)^2$, then, $$IFFT(B_n)_i = -\frac{1}{\sqrt{N}} \cdot \left( \frac{1}{1 - e^{\frac{j2\Pi(i)}{N}}} + \frac{2}{N} \cdot \frac{e^{\frac{j2\Pi(i)}{N}}}{\left(1 - e^{\frac{j2\Pi(i)}{N}}\right)^2} \right)$$

As a result, using the two previous equalities in (eq5), and by simplifying the expression using the constants of (eq8a) and (eq8b), the non diagonal terms of G can be written as in (eq7). (eq7) is the expression of the values of the non diagonal terms of the matrices in the frequency domain.

2.4 Optimization of the Estimation Introduced by the Disclosure

In the present section, one presents the advantages of the estimating method of the disclosure. Indeed, the inventors have noticed that estimation problem is reduced to finding, in the specific case presented here, three diagonal estimates in order to find the whole channel modeling parameters.

Indeed, comparing the diagonal terms obtained from (eq6) for different OFDM symbols, the inventors have observed that the estimation problem is reduced to finding three diagonal estimates in order to find the whole channel modeling parameters.

On the one hand, this simply means that once $G_{i,i}$'s is determined for three OFDM symbols, one can simply compute the corresponding $E_i$ and $U_i$ as:

$$U_i = \frac{[(4/7)(G_{i,i}^{(7)} - G_{i,i}^{(0)}) - (G_{i,i}^{(4)} - G_{i,i}^{(0)})]}{12\sqrt{N} T_0^2}, \quad (9a)$$

$$E_i = \frac{(G_{i,i}^{(4)} - G_{i,i}^{(0)})}{4\sqrt{N} T_0} - U_i\left(\frac{N-1}{N} + 4T_0\right), \quad (9b)$$

On the other hand, (eq7) can be used to calculate the ICI terms, using the computed $E_i$'s and $U_i$'s, directly in the frequency domain.

Based on these observations, the inventors have inferred that a sufficiently accurate knowledge of the diagonal terms of 3 OFDM symbols allows providing a fair estimate of all the coefficients of the G matrices.

As discussed above, only the estimation of the diagonal terms of the channel matrices corresponding to the $1^{st}$, $5^{th}$, and $8^{th}$ OFDM symbols, in this case, are needed to compute all the matrices for the whole resource block. This simply motivates the direct estimation of these terms in the frequency domain.

In this specific embodiment the $1^{st}$, $5^{th}$, and $8^{th}$ OFDM symbols are used because they comprise pilots. If the pilots were distributed in a different way among the various received symbols of the OFDM signal, other OFDM symbols would have been used and the polynomial expression would have been in a different order than the second polynomial order relation used in the example.

For time-invariant channels, channel estimation in the frequency domain has been widely investigated. For example, one method use LS estimates at the pilot locations, then use MMSE interpolation to find all estimates over the bandwidth of interest. It is also worth noting that the performance of such algorithms depends on the number of pilots used, so a complexity-performance trade-off could be made.

In the present estimation procedure, object of the disclosure, one can adopt any frequency-domain interpolation method by considering the ICI as additive noise to get sufficiently accurate estimates of the desired diagonal terms. Then, all the other terms are computed simply by using the method explained above through the equations (eq6)-(eq9). This approach is mainly practical for OFDMA systems, as one needs just estimating the assigned frequency coefficients and not the whole channel frequency response.

Then, the estimation of the coefficients of the equalization should be performed by any proper method based on the estimated G matrix (e.g., ZF or MMSE equalization, well known from the one skilled in the art and included herein by references for the purposes of the present disclosure) other than one-tap equalizer which is the default case for OFDM systems.

In summary, an example of the present disclosure presents a full-frequency domain channel estimation method for next-generation wireless systems, such as LTE and WiMAX or others, where the limited resources are allocated to users in time and frequency domains with limited pilots.

In particular, the estimation is carried out for a certain data allocation block, i.e., resource block or resource unit based systems, which is the case in next generation wireless communication systems like LTE, LTE-Adv, 16 m. The example evidences that the presented method has very low complexity for ICI computation since the estimation is performed fully in the frequency domain. It is compatible for any OFDMA based system and can be enhanced through several iterations based on decision feedback.

3. Other Features and Advantages

In a specific, exemplary embodiment of the disclosure, one can improve the method by using an iterative procedure. Indeed, in the specific embodiment explained above, it has been disclosed a non-iterative procedure where performance is limited to SINR (signal-to-interference plus noise ratio) on the carriers. Yet, this method can be extended and enhanced by applying an iterative procedure by repeating the method then obtaining an ICI cancellation.

Furthermore, an application of other basis expansion models can be envisaged (in order to generalize the application of the method): It can also be added that polynomial basis expansion modelling (i.e., the $2^{nd}$ order expansion used in the description) was particularly investigated due to its ease to analyze channel matrix but any other expansion modeling with any order can be also used for the same procedure.

Figure 3:
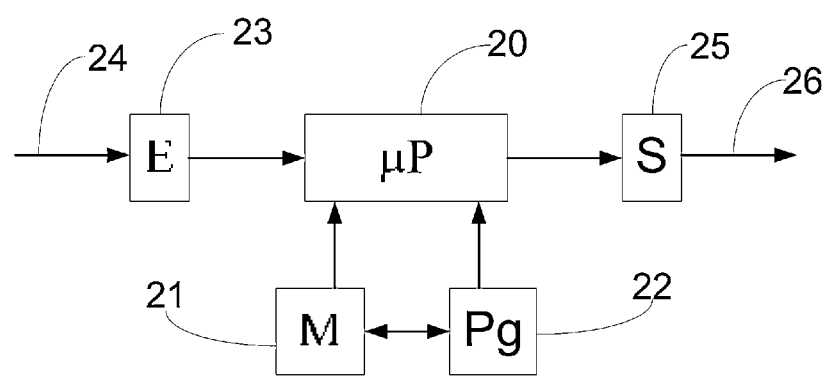
FIG. 3 illustrates a specific terminal implementing the method of an exemplary embodiment of the disclosure.

One presents, in relation with FIG. 3,

The structure of a channel estimation device is illustrated schematically in FIG. 3. It comprises a memory M 21, and a processing unit 20 equipped with a microprocessor µP, which is driven by a computer program (or application) Pg 22. At an input, the processing unit 20 receives, through a network input interface module E 23, an OFDM signal 24 which the microprocessor µP processes, according to the instructions of the program Pg 22, to estimate the channel variations, which are transmitted through an output interface module S 25, thus providing an output signal 26. The device can be included in a mobile station. It can be implemented as a specific chip or integrated in a preexistent chip.

The device comprises:
- receiver for receiving a signal comprising a series of n symbols covering at least one resource block;
- channel estimator for making an initial channel estimation by identifying said pilot carriers included in said series of symbols;
- a diagonal entries processor for determining diagonal entries of the p matrices GP;
- a non diagonal entries processor for determining, in the frequency domain, at least some the non diagonal entries of the n matrices G.

The receiver, channel estimator and processors can also be replaced by other equivalent means having similar functions as the ones previously disclosed.

Although the present disclosure has been described with reference to one or more examples, workers skilled in the art will recognize that changes may be made in form and detail without departing from the scope of the disclosure and/or the appended claims.

What is claimed is:

1. A method for estimating a transmission channel in a receiver of an OFDMA signal formed by a plurality of carriers being modulated by data elements and distributed in the time-frequency domain in successive symbols, said plurality of carriers including pilot carriers, modulated by reference data elements known by receivers, wherein said method comprises:
- a step of receiving by the receiver a series of n symbols of the OFDMA signal, covering at least one resource block;
- a step of making an initial channel estimation by identifying said pilot carriers included in said series of n symbols;
- a step of determining diagonal entries of p frequency domain channel matrices $G^{(x)}$ for estimating said channel for at least some x symbols among said n symbols, said x symbols being pilot symbols; and
- a step of determining, in the frequency domain, at least some non diagonal entries for each frequency domain channel matrix G of said n symbols from said determined diagonal entries of said x frequency domain channel matrices $G^{(x)}$, wherein said step of determining diagonal entries comprises:
- a step of transforming said signal from the time domain to the frequency domain, for delivering a corresponding frequency domain signal;
- a step of estimating, from said frequency domain signal, a first channel estimation in the frequency domain;
- a step of interpolating said first channel estimation in the frequency domain by employing a linear expression in order to determine diagonal entries of said matrices $G^{(x)}$, wherein said linear expression comprises:

$$G_{i,i}^{(p)} = \sqrt{N}\left(H_{i,0} + pT_0 E_i + (pT_0)^2 U_i\right) + \frac{N-1}{2\sqrt{N}}(E_i + 2pT_0 U_i) + \frac{(N-1)(2N-1)}{6N\sqrt{N}} U_i$$

where:
p is a symbol index of the $(p+1)^{th}$ received symbol;
N is a number of carriers of a symbol;
H is the Fourier transform of the channel impulse response for the entry i;
$T_0$ is equal to $1+L_{CP}/N$, where $L_{CP}$ is the length of the cyclic prefix;
$E_i$ and $U_i$ are the FFT transformation of basis coefficients for the variation of the channel of a certain time window:

$$U_i = \frac{[(4/7)(G_{i,i}^{(7)} - G_{i,i}^{(0)}) - (G_{i,i}^{(4)} - G_{i,i}^{(0)})]}{12\sqrt{N}\, T_0^2}$$

$$E_i = \frac{(G_{i,i}^{(4)} - G_{i,i}^{(0)})}{4\sqrt{N}\, T_0} - U_i\left(\frac{N-1}{N} + 4T_0\right).$$

2. The method according to claim 1, wherein said step of determining diagonal entries is implemented for three pilot symbols.

3. The method according to claim 1, wherein said step of determining at least some non diagonal entries employs a polynomial expression of any order, depending on a pilot distribution among said series of symbols.

4. The method according to claim 3, wherein said polynomial expression is a second order polynomial expression.

5. The method according to claim 4, wherein said second order polynomial expression is:

$$G_{i,k}^{(p)} = C_e(\mathrm{mod}((k-i), N))E_k + C_u(\mathrm{mod}((k-i), N))U_k + 2pT_0 C_e(\mathrm{mod}((k-i), N))U_k$$

where $C_e$ and $C_u$ are constants defined as $$C_e(n) = \frac{-1}{\sqrt{N}} \cdot \frac{1}{1 - \exp(j2\pi n/N)},$$

$$C_u(n) = \frac{-1}{\sqrt{N}} \cdot \left(\frac{1}{1 - \exp(j2\pi n/N)} + \frac{2}{N} \cdot \frac{\exp(j2\pi n/N)}{(1 - \exp(j2\pi n/N))^2}\right),$$

with $n \neq 0$ and:

$$U_k = \frac{[(4/7)(G_{k,k}^{(7)} - G_{k,k}^{(0)}) - (G_{k,k}^{(4)} - G_{k,k}^{(0)})]}{12\sqrt{N}\, T_0^2},$$

$$E_k = \frac{(G_{k,k}^{(4)} - G_{k,k}^{(0)})}{4\sqrt{N}\, T_0} - U_k\left(\frac{N-1}{N} + 4T_0\right),$$

and
$G^{(7)}$, $G^{(4)}$ and $G^{(0)}$ are matrices of the eighth, fifth and first symbols of said series of n symbols and
p is a $(p+1)^{th}$ received symbol;
N is a number of carriers of a symbol;
$T_0$ is equal to $1+L_{CP}/N$, where $L_{CP}$ is the length of the cyclic prefix.

6. A device for estimating a transmission channel in a receiver of an OFDMA signal formed by a plurality of carriers being modulated by data elements and distributed in the time-frequency domain in successive symbols, said plurality of carriers including pilot carriers, modulated by reference data elements known by receivers, wherein said device comprises:

means for receiving a series of n symbols of the OFDMA signal, covering at least one resource block;

means for making an initial channel estimation by identifying said pilot carriers included in said series of n symbols;

means for determining diagonal entries of x frequency domain channel matrices $G^{(x)}$ for estimating said channel for at least some x symbols among said n symbols, said x symbols being pilot symbols; and means for determining, in the frequency domain, at least some non diagonal entries for each frequency domain channel matrix G of said n symbols from said determined diagonal entries of said x frequency domain channel matrices $G^{(x)}$, wherein determining diagonal entries comprises:

transforming said signal from the time domain to the frequency domain, for delivering a corresponding frequency domain signal;

estimating, from said frequency domain signal, a first channel estimation in the frequency domain;

interpolating said first channel estimation in the frequency domain by employing a linear expression in order to determine diagonal entries of said matrices $G^{(x)}$, wherein said linear expression comprises:

$$G_{i,i}^{(p)} = \sqrt{N}\,(H_{i,0} + pT_0 E_i + (pT_0)^2 U_i) + \frac{N-1}{2\sqrt{N}}(E_i + 2pT_0 U_i) + \frac{(N-1)(2N-1)}{6N\sqrt{N}}U_i$$

where:

p is a symbol index of the $(p+1)^{th}$ received symbol;

N is a number of carriers of a symbol;

H is the Fourier transform of the channel impulse response for the entry i;

$T_0$ is equal to $1+L_{CP}/N$, where $L_{CP}$ is the length of the cyclic prefix;

$E_i$ and $U_i$ are the FFT transformation of basis coefficients for the variation of the channel of a certain time window:

$$U_i = \frac{[(4/7)(G_{i,i}^{(7)} - G_{i,i}^{(0)}) - (G_{i,i}^{(4)} - G_{i,i}^{(0)})]}{12\sqrt{N}\,T_0^2}$$

$$E_i = \frac{(G_{i,i}^{(4)} - G_{i,i}^{(0)})}{4\sqrt{N}\,T_0} - U_i\left(\frac{N-1}{N} + 4T_0\right).$$

7. A memory device comprising a computer program product stored thereon and comprising instructions of program code for implementing a method of estimating a transmission channel in a receiver of an OFDMA signal formed by a plurality of carriers being modulated by data elements and distributed in the time-frequency domain in successive symbols, said plurality of carriers including pilot carriers, modulated by reference data elements known by receivers, when the instructions are run on a computer, wherein said method comprises:

a step of receiving by the receiver a series of n symbols of the OFDMA signal, covering at least one resource block;

a step of making an initial channel estimation by the receiver by identifying said pilot carriers included in said series of n symbols;

a step of determining by the receiver diagonal entries of p frequency domain channel matrices $G^{(x)}$ for estimating said channel for at least some x symbols among said n symbols, said x symbols being pilot symbols; and a step of determining by the receiver, in the frequency domain, at least some non diagonal entries for each frequency domain channel matrix G of said n symbols from said determined diagonal entries of said x frequency domain channel matrices $G^{(x)}$, wherein said step of determining diagonal entries comprises:

a step of transforming said signal from the time domain to the frequency domain, for delivering a corresponding frequency domain signal;

a step of estimating, from said frequency domain signal, a first channel estimation in the frequency domain;

a step of interpolating said first channel estimation in the frequency domain by employing a linear expression in order to determine diagonal entries of said matrices $G^{(x)}$, wherein said linear expression comprises:

$$G_{i,i}^{(p)} = \sqrt{N}\,(H_{i,0} + pT_0 E_i + (pT_0)^2 U_i) + \frac{N-1}{2\sqrt{N}}(E_i + 2pT_0 U_i) + \frac{(N-1)(2N-1)}{6N\sqrt{N}}U_i$$

where:

p is a symbol index of the $(p+1)^{th}$ received symbol;

N is a number of carriers of a symbol;

H is the Fourier transform of the channel impulse response for the entry i;

$T_0$ is equal to $1+L_{CP}/N$, where $L_{CP}$ is the length of the cyclic prefix;

$E_i$ and $U_i$ are the FFT transformation of basis coefficients for the variation of the channel of a certain time window:

$$U_i = \frac{\left[\left(\frac{4}{7}\right)(G_{i,i}^{(7)} - G_{i,i}^{(0)}) - (G_{i,i}^{(4)} - G_{i,i}^{(0)})\right]}{12\sqrt{N}\,T_0^2}$$

$$E_i = \frac{(G_{i,i}^{(4)} - G_{i,i}^{(0)})}{4\sqrt{N}\,T_0} - U_i\left(\frac{N-1}{N} + 4T_0\right).$$

* * * * *